Patented Mar. 4, 1952

2,588,324

UNITED STATES PATENT OFFICE 2,588,324

DENTAL PASTE

John B. Lewis, Englewood, N. J., and Leonard Kenner, New York, N. Y., assignors to Amm-I-Dent, Inc., Jersey City, N. J., a corporation of New Jersey No Drawing. Application October 13, 1949, Serial No. 121,226

10 Claims. (Cl. 167—93)

Our present invention is concerned with dentifrice that incorporates anti-caries agent that furnishes available ammonia in which such agent (hereinafter sometimes designated the active agent), comprises both urea and dibasic ammonium phosphate as ingredients thereof, but the present invention is particularly concerned with incorporating such active agent in a dental paste.

The incorporation in a dental paste of substances capable of furnishing ammonia and particularly of urea and dibasic ammonium phosphate presents major difficulties among which are the following:

(a) Where either or both soap and dicalcium phosphate or calcium carbonate ingredients are used, alkalinity is imparted that results in premature release of ammonia from the dibasic ammonium phosphate, and thus not only is some or all of the active agent lost prior to discharge of the paste from the encasing tube, but the pressure of the released ammonia may lead to swelling and rupture of such tube, so that the commodity becomes useless and unsalable even as an ordinary dental paste that is devoid of caries checking utility;

(b) The atttempt to incorporate in the limited amount of water permissible in ordinary dental paste a sufficenit amount i. e., up to 20 per cent of active agent for true efficiency will at best result in an unstable solution from which will crystallize part or all of such agent, especially in the cold environment frequently encountered in transit, so that the active agent may become injurious by excessive abrasive action, especially when the crystals grow to relatively large size;

(c) The impurities usually present in abrasive of calcium compound would release carbon dioxide gas in an acid environment, with one of the objections pointed out in item (a) above;

(d) If the paste presents an acid environment the urea will in time release carbon dioxide with like objection;

(e) Unless the proportion of glycerin commonly used in such conventional paste is kept too low for complete efficacy for its usual purpose of maintaining the water content of the paste, much of the urea may be thrown out of solution with the objections pointed out in item (b) above;

(f) Unlike the ingredients of ordinary dental paste, urea is more subject to decomposition than are any of ingredients of conventional dental pastes by the action of bacteria, mold and yeast and the bactericides commonly used in the food industry would not function in alkaline medium and thus would be inactivated by the ingredients of the paste; and (g) The various active agents and ingredients will not cling to and between the teeth with sufficient tenacity for continued action thereof after brushing.

It is accordingly among the objects of the invention to provide a dental paste that incorporates urea and dibasic ammonium phosphate in proportions adequate for checking Lactobacillus acidophilus and other oral bacteria involved in the carious process, which, while fully as efficacious as ordinary dental paste so far as its detergent action is concerned, is yet not alkaline in nature, nor does it include alkaline components, either in the form of abrasive or in the form of soap, and accordingly affords a medium that prevents premature release of ammonia from the dibasic ammonium phosphate, and likewise precludes precipitation of the urea from solution which is undesirable, yet makes the active agent available when in the mouth, which will maintain its pasty consistency without becoming too fluid on the one hand, or setting or hardening on the other, from which the dibasic ammonium phosphate or urea will not crystallize out, even when exposed to the cold as in transit and which is and remains sterile despite its urea component, such sterility being attained without rendering the paste toxic, or effecting release of ammonia from the dibasic ammonium phosphate component.

One feature of the invention is the solution of the active agent of urea and dibasic ammonium phosphate in a base or vehicle that is neutral, in which the phosphate will not hydrolyze and from which the active agent will not crystallize even under extreme conditions encountered in practice. A highly effective vehicle for the purpose consists of a mixture of sorbitol, glycerol and water.

Sorbitol has a unique combination of advantages for the purpose, among which are that it is a solvent for urea, that it suppresses the hyrolysis of the phosphate, that it improves the texture of the product, that it does not readily crystallize and that it is non-toxic.

The glycerol component of the base or vehicle serves as a stabilizer to check crystallization of the active agent with temperature drop, is non-toxic and incidentally serves as a humectant but is not in proportion so great as to precipitate the urea.

The water component of the base or vehicle is in amount sufficient, that when admixed with the sorbitol and the glycerol components, a solution is attained which when mixed with the solid ingredient forms a paste of the desired consistency.

The liquid phase of the paste, that is, the solution of the active agent and other components in sorbitol, glycerol and water is made substantially neutral and accordingly will not effect release of ammonia from the dibasic ammonium phosphate.

According to another feature, the non-soluble or abrasive component of the dental paste is tricalcium phosphate, which is substantially neutral in character and therefore does not effect release of ammonia from the dibasic ammonium phosphate and is grit-free.

The percentages of the active agent are urea, 10 to 20 per cent, preferably about 13 per cent and dibasic ammonium phosphate 2 to 10 per cent, preferably about 3 per cent by weight of the paste, in which concentration the components of the active agent will not crystallize out, even at the low temperatures sometimes incurred in transit. Such crystallization would be objectionable, because the crystals, when grown to substantial size, constitute a mechanical irritant.

The preferred proportions of the vehicle or base are sorbitol 10 to 20 per cent, glycerol 8 to 15 per cent, and water 15 to 25 per cent by weight of the paste. The urea and dibasic ammonium phosphate up to the percentages thereof, above set forth, readily enter into solution in the base or vehicle when slightly heated, the active agent being soluble in both sorbitol and water.

A preferred base or vehicle is of the following composition: sorbitol 14.5 parts, glycerol 10 parts and water 16 to 17 parts, said parts being percentages by weight of the paste. An excess of water would render the paste too thin while a deficiency thereof would preclude solution of the urea. An excess of glycerol would tend to throw urea out of solution, and a deficiency therof would not effectively stabilize the paste.

A dental paste formulated as thus far set forth would soon spoil due to bacterial decomposition of the urea and of the sorbitol and the glycerol components. Familiar preservatives such as sodium benzoate or parahydroxybenzoate, which might ordinarily be used for such purposes in the art are ineffectual in a medium such as the dental paste described. It is accordingly another feature of the invention to incorporate in the dental paste a substance which, in minor proportions, will act as an effective fungicide and germicide and thereby effectively prevent such decomposition. Moreover, by its germicidal and fungicidal action, said substance controls or reduces the numbers of oral flora such as bacteria, molds, yeast and other organisms which may be involved in the carious process. We have discovered that a truly efficacious material for this purpose is a hydroxy halogeno diphenyl alkane, preferably a hydroxy chloro-diphenyl methane, the best results having thus far been obtained with 2,2'-di-hydroxy polychloro diphenyl methane and specifically with 2,2'-di-hydroxy-5,5'-di-chloro diphenyl methane or 2,2' - di - hydroxy, 3,5,6-3',5',6' hexachlor-diphenyl methane.

By reason of the substantial insolubility in water of the said fungicide and germicide, it is incorporated in the paste by first dissolving it in the essential flavoring oil component of the paste and emulsifying and dispersing that solution in the liquid phase of the paste.

While the compound above set forth may be used as the sole fungicide and germicide, we have discovered that it is very desirable to use it in combination with a surface active agent that is readily soluble in the liquid phase; particularly with a compound of the general formula: $(R_1—SO_4—R_2)X$ where $R_1$ is a fatty acid of 12 to 18 carbon atoms, $R_2$ is an acetate or an amino ethyl complex and X is an alkali metal, one specific and preferred embodiment of which compound is sodium lauryl sulfoacetate which incidentally also acts as a detergent. We have discovered that there is a very pronounced synergistic action between said germicidal and fungicidal diphenyl compound and said surface active agent which results in a tremendously multiplied sterilizing action.

In particular, a dental paste that incorporates about 0.25 per cent of 2,2'-di-hydroxy-5,5'-di-chloro diphenyl methane, together with 2 per cent of sodium lauryl sulfoacetate, when used in a dilution as great as 1 to 50, (a 1 to 20,000 dilution of the 2,2'-di-hydroxy-5,5'-di-chloro-diphenyl methane), kills *Staphylococcus aureus*. Since the diphenyl methane above set forth by itself kills *Staphylococcus aureus* at dilutions no greater than 1 to 2,500, an eight-fold increase in germicidal power is thus attained, a surprising and unexpected result of great importance.

Thus, according to the present invention, the use of the surface active agent and particularly of sodium lauryl sulfoacetate results in greatly multiplying the germicidal action of the diphenyl methane, and therefore kills *Staphylococcus aureus* and other oral micro-organisms which may be involved etiologically in caries. Moreover the surface active agent functions effectively as a detergent.

A small amount of aminoacetic acid or glycocoll is desirably added to cloak the objectionable taste of the diphenyl methane, the urea, the dibasic ammonium phosphate and the surface active agent.

The insoluble and grit-free abrasive ingredient of tricalcium phosphate is present in the paste in proportions of 35 to 40 per cent preferably of 38 to 39 per cent by weight, the liquid phase making up the balance. A lower proportion of tricalcium phosphate would render the paste too liquid and a higher proportion would impart thereto a more or less concrete-like consistency which renders mixture thereof difficult if not impossible.

The dental paste preferably also includes a minor proportion of a bodying and adhesive agent of the type that is not acted upon and maintains its viscosity, though many other products of a generally similar nature such as natural gums, the alginates or the carageenates lose their viscosity and become liquid on ageing in the presence of urea. The bodying and adhesive agent of the present invention is a methyl cellulose and preferably carboxy-methyl cellulose which we have discovered to be unaffected by urea even on long contact.

After the paste has been otherwise compounded, sufficient phosphoric acid is added thereto to bring it substantially to neutrality (pH6.9 to 7.1).

For compounding the paste, its various ingredients as above described, together with conventional flavoring oil in which latter the desired diphenyl methane has been dissolved, are mixed together in a mixer at room temperature for thorough comminution of the abrasive and homogeneous mixture of the various ingredients into a smooth paste of the desired consistency.

To avoid crystallization, release of ammonia, liquification or other difficulties, the ingredients are admixed in the following order: the urea is first dissolved in the water with the aid of heat; the methyl cellulose is mixed with the glycerine and added to the solution of urea; and the aminoacetic acid, the sodium lauryl sulfoacetate, the sorbitol and the saccharin are then added; whereupon the tricalcium phosphate is mixed in slowly until a very heavy paste is formed. The solution of diphenyl methane in the flavoring oils is thereupon mixed into the paste and finally the dibasic ammonium phosphate is added, followed immediately by the addition of sufficient phosphoric acid to adjust the pH to 6.9 to 7.1 and thus to preclude release of ammonia.

One specific formula of dental paste according to the present invention, that is being used extensively in commercial practice is:

| | Percentage by weight |
|---|---|
| Tricalcium phosphate | 28.67 |
| Urea | 13.0 |
| Dibasic ammonium phosphate | 3.0 |
| Sorbitol | 14.5 |
| Glycerol | 10.0 |
| Water | 16.64 |
| 2,2' - di - hydroxy - 5,5' - dichloro-diphenyl methane | 0.25 |
| Sodium lauryl sulfoacetate | 2.0 |
| Aminoacetic acid | 0.34 |
| Carboxyl methyl cellulose | 0.28 |
| Flavoring oil | 1.1 |
| Saccharin | 0.23 |

The paste with the components set forth, combined as above set forth, may be packaged in the conventional dental paste tubes, without the slightest danger of crystallization of the active agent or other component thereof, or of fermentation of the urea, sorbitol or glycerol. Nor is there any danger of ammonia being released from the dibasic ammonium phosphate component or of carbon dioxide from the tricalcium phosphate while in the tube and the loss of efficacy due to such release and swelling or bursting of the tube due to such action is obviated and the packaged paste will have long shelf life.

Under conditions of use of the paste, the active agent attacks the protein of the plaques of the teeth and the paste being sticky and not readily dispersible in water clings to the teeth even after rinsing, for a sustained attack upon these foci of bacteria by the action thereon of the urea and the dibasic ammonium phosphate, and the further fungicidal and germicidal synergistic action above set forth of the diphenyl methane and the surface active agent.

A tentative theory of the mode of action of our dental paste is as follows: The active agent of the dentifrice attacks both macro and microplaques that adhere to the teeth, and which are not removed by mechanical brushing. This attack is by chemical action of the urea upon the protein molecules of the organisms forming the plaques, which results in unfolding their protein linkages to simpler amino acid complexes with which the ammonium radical or more probably the entire dibasic ammonium phosphate molecule of the paste readily combines to produce a sustained hydrogen ion concentration or buffering action in the mouth that is inimical to oral bacteria. The surface active agent, particularly sodium lauryl sulfoacetate, materially enhances the rate of diffusion of the urea into the plaques with increased efficacy of action. Moreover, that surface active agent by its synergistic action with the fungicide and germicide component adhering to the teeth by reason of the sticky nature of the paste affords prolonged bactericidal action. The plaques are thus changed into an unfavorable environment for the fermentative organisms which are unable to adjust such environment to their requirements with sufficient rapidity to survive. Therefore, these foci of fermentation attached to the teeth are substantially sterilized and gradually removed, with consequent reduction of caries or tooth decay.

As many changes could be made in the above composition and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. A dental paste comprising an active agent of urea and dibasic amonium phosphate, substantially grit-free neutral abrasive, and a substantially neutral vehicle wherein said agent is in solution, said vehicle consisting essentially of 10 to 20 parts by weight of sorbitol, 8 to 15 parts by weight of glycerol and 15 to 25 parts by weight of water.

2. A dental paste comprising an active agent of urea and dibasic ammonium phosphate, substantially grit-free neutral abrasive, and a substantially neutral vehicle in which said agent is in solution, said vehicle consisting essentially of about 14.5 parts by weight of sorbitol, about 10 parts of glycerol and 16 to 17 parts of water.

3. A dental paste comprising an active agent by weight about 13 per cent of urea and about 3 per cent of dibasic ammonium phosphate, substantially grit-free neutral abrasive, and a substantially neutral vehicle in which said agent is in solution, said vehicle consisting essentially of 10 to 20 parts of sorbitol, 8 to 15 parts of glycerol, and 10 to 25 parts of water.

4. A dental paste comprising an active agent of substantially 10 to 20 per cent of urea and 2 to 10 per cent of dibasic ammonium phosphate, a substantially grit-free neutral abrasive and a vehicle, the latter consisting essentially, by weight of 10 to 20 parts of sorbitol, 8 to 15 parts of glycerol and 15 to 25 parts of water.

5. A dental paste comprising tricalcium phosphate, an active agent by weight of about 13 per cent of urea and about 3 per cent of dibasic ammonium phosphate, and a vehicle in which said active agent is in solution, said vehicle consisting essentially of about 14.5 parts of sorbitol, about 10 parts of glycerol and about 16 to 17 parts of water.

6. A dental paste comprising tricalcium phosphate and a substantially neutral vehicle consisting of 10 to 20 parts sorbitol, 8 to 15 parts glycerol and 15 to 25 parts of water and having in solution therein, 10 to 20 per cent of urea by weight of the paste and 2 to 10 per cent of dibasic ammonium phosphate by weight of the paste, said paste also including a surface active agent of sodium lauryl sulfoacetate and having in suspension therein a minor proportion of 2,2'-di-hydroxy-5,5'-dichloro diphenyl-methane.

7. A dental paste of tricalcium phosphate, a substantially neutral vehicle consisting of about 14.5 parts of sorbitol, about 10 parts of glycerin and 16 to 17 parts of water, having in solution therein about 13 per cent of urea and about 3 per cent of dibasic ammonium phosphate as active agent, and including also about 2 per cent of sodium lauryl sulfoacetate and having in suspension therein about 0.25 per cent of 2,2'-dihydroxy-polychloro diphenyl-methane.

8. A dental paste comprising in percentage by weight of the paste 35 to 40 per cent of tricalcium phosphate, the balance comprising a substantially neutral vehicle consisting of 10 to 20 parts of sorbitol, 8 to 15 parts of glycerol and 10 to 25 parts of water and having dissolved therein active agent consisting of about 13 per cent of urea and about 3 per cent of dibasic ammonium phosphate and having also dissolved therein about 2 per cent of sodium lauryl sulfoacetate, said vehicle having also suspended therein about 0.25 per cent of 2,2'-di-hydroxy-polychloro diphenyl-methane.

9. A dental paste comprising in percentage by weight of the paste 38 to 39 per cent of tricalcium phosphate, the balance comprising a vehicle of about 14.5 parts of sorbitol, about 10 parts of glycerol and 16 to 17 parts of water and having dissolved therein active agent consisting of about 13 per cent of urea and about 3 per cent of dibasic ammonium phosphate and having also dissolved therein about 2 per cent of sodium lauryl sulfoacetate, said vehicle having suspended therein about 0.25 per cent of 2,2'-di-hydroxy-5,5'-dichloro diphenyl-methane.

10. The method of compounding the dental paste claimed in claim 8 which comprises the following mixing steps in the following order: dissolving urea in water, mixing bodying and adhesive agent of a methyl cellulose with glycerine and adding the mix to the urea solution, adding aminoacetic acid, surface active agent and sorbitol, then mixing in slowly tricalcium phosphate to form a heavy paste, adding thereto and dispersing therein an emulsified solution of hydroxy halogeno diphenyl alkane in flavoring oil and finally adding dibasic ammonium phosphate, followed by the prompt addition of sufficient phosphoric acid to adjust the pH of the mass to 6.9 to 7.1.

JOHN B. LEWIS.
LEONARD KENNER.

REFERENCES CITED

The following references are of record in the file of this patent:

UNITED STATES PATENTS

| Number | Name | Date |
| --- | --- | --- |
| 2,353,725 | Gump | July 18, 1944 |
| 2,354,012 | Gump | July 18, 1944 |
| 2,436,818 | Musher | Mar. 2, 1948 |

FOREIGN PATENTS

| Number | Country | Date |
| --- | --- | --- |
| 471,592 | Great Britain | Sept. 6, 1937 |

OTHER REFERENCES

Drug and Cosmetic Industry, (1) June 1949, pages 696 and 697.

Drug and Cosmetic Industry, (2) December 1948 (Reader's Questions), page 8, first formula.

Chem. Eng. News, April 1948, Advertisement on page 1173, "New Ways to Use CMC."

Medical Record, September 3, 1941, pages 190 to 193.

Atlas Powder Co. pamphlet, "Atlas Sorbitol" (copy. 1947), pages 16 and 17.

Henschel Jour. of Dent. Research (a reprint), page 3 pert., June 1949.

Henschel: The N. Y. Jour. of Dent., March 1946, page 104 pert.

Kesel et al.: Drug and Cosmetic Ind., October 1947, page 525.